United States Patent
Dow et al.

(10) Patent No.: US 6,935,488 B2
(45) Date of Patent: Aug. 30, 2005

(54) BLADE PULLEY

(75) Inventors: Paul W. Dow, Byron, NY (US); Steven S. Dow, Byron, NY (US); Christopher M. Schloesser, Hudson, WI (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 10/767,918

(22) Filed: Jan. 29, 2004

(65) Prior Publication Data

US 2004/0231965 A1 Nov. 25, 2004

Related U.S. Application Data

(63) Continuation-in-part of application No. 10/405,073, filed on Mar. 31, 2003.

(51) Int. Cl.⁷ .............................................. B65G 35/10
(52) U.S. Cl. ......................................... 198/835; 193/37
(58) Field of Search .......................... 198/835; 193/37; 474/185

(56) References Cited

U.S. PATENT DOCUMENTS

| | | |
|---|---|---|
| 77,295 A | 4/1868 | Krausch |
| 369,023 A | 8/1887 | Newell |
| 417,512 A | 12/1889 | Rosquist |
| 455,799 A | 7/1891 | Norlin |
| 855,899 A | 6/1907 | Mercer |
| 1,235,656 A | 8/1917 | Cobb |
| 1,544,192 A | 6/1925 | Smith |
| 1,691,993 A * | 11/1928 | Rogers ........................ 474/185 |
| 1,818,297 A | 8/1931 | Bowlus |
| 2,023,611 A | 12/1935 | Neuman |
| 2,232,623 A | 2/1941 | Neuman |
| 2,236,027 A * | 3/1941 | Bowen et al. ................. 474/96 |
| 2,356,026 A | 8/1944 | Berry |
| 2,687,209 A | 8/1954 | Rost et al. |
| 2,787,913 A | 4/1957 | Hageline |
| 3,016,235 A | 1/1962 | Cnudde |
| 3,046,805 A | 7/1962 | Van Gorp |
| 3,055,229 A | 9/1962 | Mecham |
| 3,274,707 A | 9/1966 | Garden |
| 3,275,126 A | 9/1966 | Hartzell, Jr. |
| 3,297,147 A | 1/1967 | Sackett, Sr. |
| 3,753,488 A | 8/1973 | Wilson |
| 3,948,114 A | 4/1976 | Koinzan |
| 4,089,784 A * | 5/1978 | Ettelt et al. .................. 210/526 |
| 4,489,827 A | 12/1984 | Anderson |
| 4,540,389 A | 9/1985 | Ramsey |
| 4,643,294 A | 2/1987 | Whited |
| 4,721,497 A | 1/1988 | Jager |
| 4,757,576 A | 7/1988 | Jaubert |
| 4,836,361 A * | 6/1989 | Herren ........................ 198/843 |
| 4,906,226 A | 3/1990 | Hecker et al. |
| 4,956,914 A | 9/1990 | Valster et al. |
| 5,011,003 A | 4/1991 | Gladding |
| 5,114,001 A | 5/1992 | Anderson |
| 5,232,407 A | 8/1993 | Wolf et al. |
| 5,449,063 A * | 9/1995 | Thomas, Sr. ................ 198/834 |
| 5,632,701 A | 5/1997 | Neel |
| 5,979,639 A | 11/1999 | Sytema |
| 6,053,308 A | 4/2000 | Vogrig et al. |
| 6,216,849 B1 | 4/2001 | Sytema |
| 6,238,131 B1 | 5/2001 | Watts et al. |

* cited by examiner

*Primary Examiner*—Douglas Hess
(74) *Attorney, Agent, or Firm*—Merchant & Gould P.C.

(57) ABSTRACT

A bladed pulley including a plurality of blades extending from a first end to a second end. The bladed pulley having spaced apart blades and an open, central volume configuration to permit conveyed material to fall through the pulley. The bladed pulley further having orienting members located at the ends of the pulley, the orienting members including slots that radially orient and position each of the blades about a longitudinal axis of the bladed pulley. Ends of the blades define bores configured to receive bearing or hub components. The bladed pulley may include retaining members to retain the bearing or hub components within the bores defined by the ends of the blades.

20 Claims, 13 Drawing Sheets

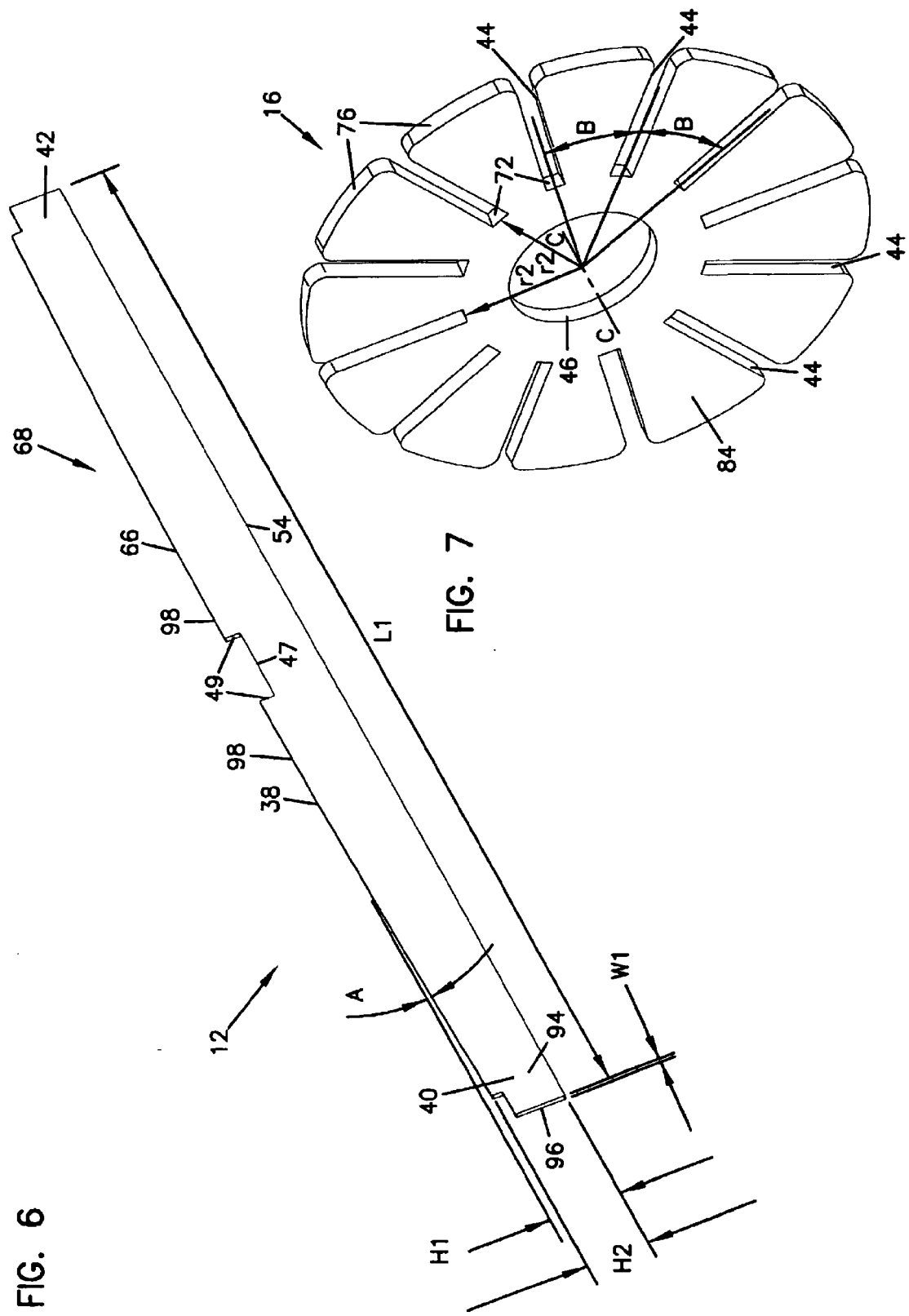

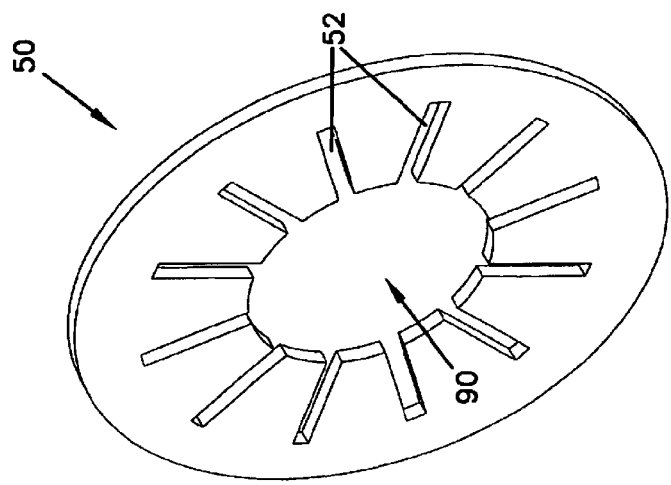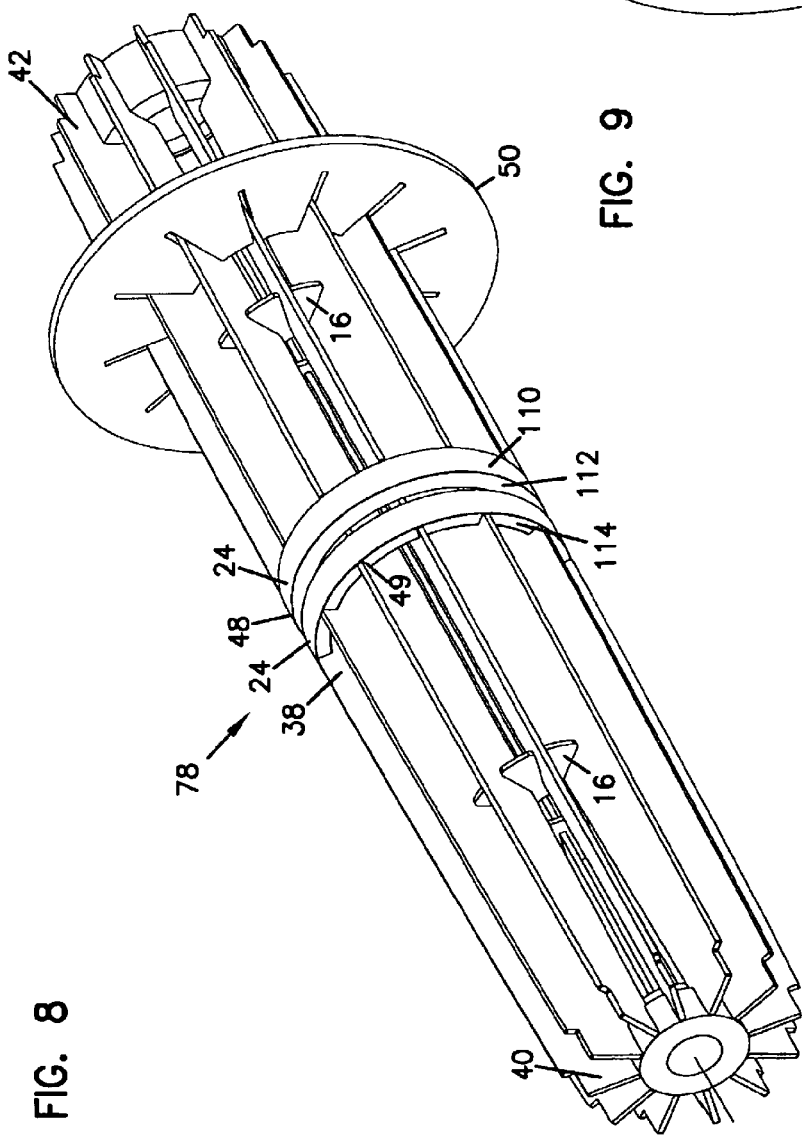
FIG. 8
FIG. 9

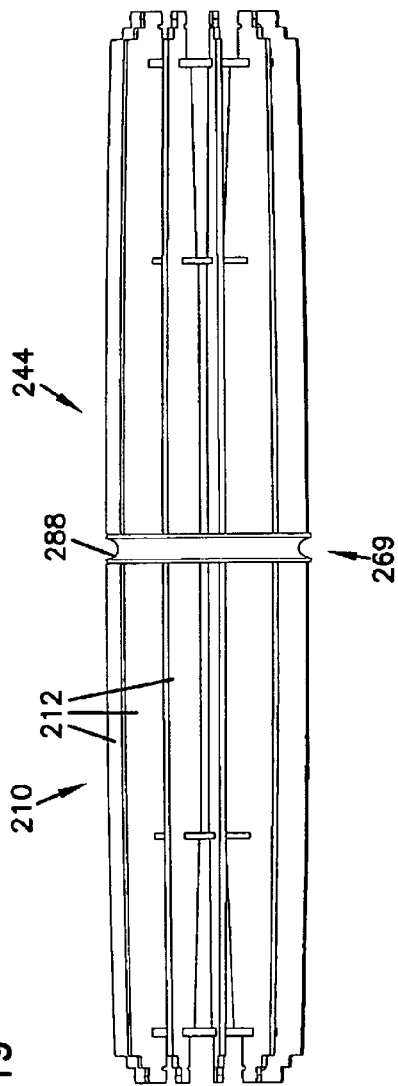
FIG.19
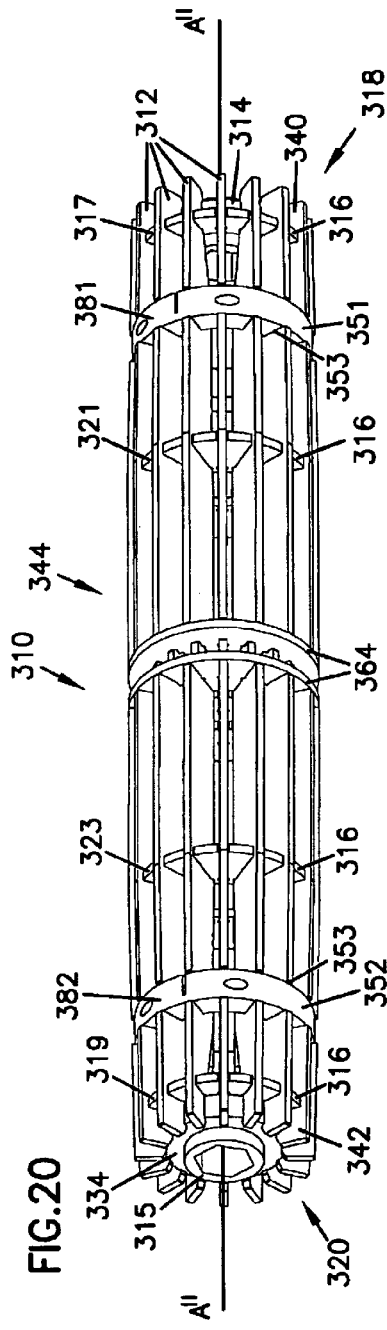
FIG.20
FIG.21

BLADE PULLEY

CROSS-REFERENCE TO RELATED APPLICATIONS

This application is a continuation-in-part of application Ser. No. 10/405,073, filed Mar. 31, 2003, which application is incorporated herein by reference.

TECHNICAL FIELD

This disclosure relates generally to pulleys such as are used with belt conveyors. More particularly, this disclosure relates to a blade pulley, and methods related thereto.

BACKGROUND

The following disclosure relates generally to conveyor pulleys, sometimes referred to as rollers. Pulleys can be used with a conveyor, typically a belt conveyor, in either a driving arrangement, an idling arrangement, or a tensioning arrangement. The belt conveyor is typically arranged in a loop configuration, conveying material along the outer top surface of the belt. Use of belt conveyors often results in some of the conveyed material falling from the belt onto the inner, lower surface of the belt. Problems arise when the fallen material works its way toward the pulleys, whether the idler, the driver, or the tensioning pulley. In some cases, the fallen material becomes entangled about the circumference of the pulley causing damage to the belt and the pulley itself. In other cases, the fallen material becomes entangled with a central shaft extending between ends of the pulley, causing damage to the bearings or drive components of the pulley. Even if an operator discovers the fallen material prior to sustaining equipment damage, unclogging material entanglement and build up results in equipment down time, thereby decreasing efficiency and productivity.

Various pulley designs have come about in an attempt to address some of these problems. In general, improvement has been sought with respect to such designs generally to: better accommodate manufacturing processes, reduce overall pulley weight, improve structural integrity of the pulley, and increase productivity by eliminating material build up. The present invention addresses these and other problems associated with conveyor pulleys.

SUMMARY

In one aspect, the present disclosure relates to a pulley for use with a conveyor belt. The pulley has a longitudinal axis extending between a first end and a second end. The pulley also includes orienting members and a plurality of blades. The orienting members are positioned between the first and second ends of the pulley and include a plurality of slots. Each of the blades of the plurality of blades is positioned within one of the plurality of slots such that the blades extend radially outward from the longitudinal axis of the pulley. The blades have a first blade end, a second blade end, and an inner edge. The inner edges of the blades define a bore at each of the ends of the pulley. A bearing is positioned within the one of the bores.

In another aspect, the present disclosure relates to a pulley having a plurality of blades and first and second support plates. Inner edges of the blades define a central pulley volume. The first and second support plates are located adjacent to first and second ends of the pulley. Each of the support plates includes a center portion and a plurality of slots extending radially outward from the central portion. Each blade of the plurality of blades is positioned in one of the plurality of slots of the first and second support plates. A bearing is positioned adjacent to the central portion of one of the first and second support plates. The inner edges of the blades contact an outer diameter of the bearing to assist in maintaining the position of the bearing adjacent to the support plate.

In yet another aspect, the present disclosure relates to a pulley having a plurality of blades positioned with slots of an orienting member such that the blades extend radially outward from a longitudinal axis of the pulley. Each of the blades includes an outer edge and an inner edge. The inner edges of the blades define a central open volume region and a bore configured to receive a bearing at one of first and second ends of the pulley. The pulley also includes open regions located between the blades that extend into the central open volume region of the pulley.

These features of novelty and various other advantages, which characterize the invention, are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6 is a perspective view of a blade of the bladed pulley, shown in FIG. 3;

FIG. 7 is a perspective view of a bulkhead shown in FIG. 3;

FIG. 8 is a perspective view of the bladed pulley of FIG. 3, shown with an assembly tool;

FIG. 9 is a perspective view of the assembly tool shown in FIG. 8;

FIG. 19 is an elevational view of the bladed pulley and Vee-guide groove configuration of FIG. 18;

FIG. 20 is a perspective view of a third embodiment of a bladed pulley in accordance with the principles of the present disclosure; and FIG. 21 is a partial perspective view of a blade shown in FIG. 20.

DETAILED DESCRIPTION

With reference now to the various figures in which identical elements are numbered identically throughout, a description of various exemplary aspects of the present invention will now be provided.

I. Overview of the Pulley Device and Use

In general, the present invention relates to a bladed pulley for use with a conveyor system. In typical applications, the conveyor system includes a rubber belt and one or more conveyor pulleys. Conventional conveyor pulleys are generally small in diameter and have a solid, welded construction. A center Vee-groove or Vee-guide formed in the pulley construction is often used to guide or "track" the belt. The belt commonly has a corresponding structure molded in an inner surface. Pulleys and belt conveyors of this type have been used in many different applications and industries.

The bladed pulley of the present invention is directed toward use in the agricultural industry. In particular, the bladed pulley can be used on stationary or transportable agricultural equipment such as a windrow merger machine, pea and bean harvesters, fruit harvesters, and other agricultural equipment. Although the bladed pulley describe herein is described in use with equipment of the agricultural industry, it is to be understood that the principles disclosed can be applied to many other types of industries employing conveyor belt and pulley arrangements.

To generally understand the operation of the disclosed bladed pulley, a first embodiment of the disclosed bladed pulley will now be described in an exemplary use context; in particular in use with a windrow merger machine.

Figure 1:
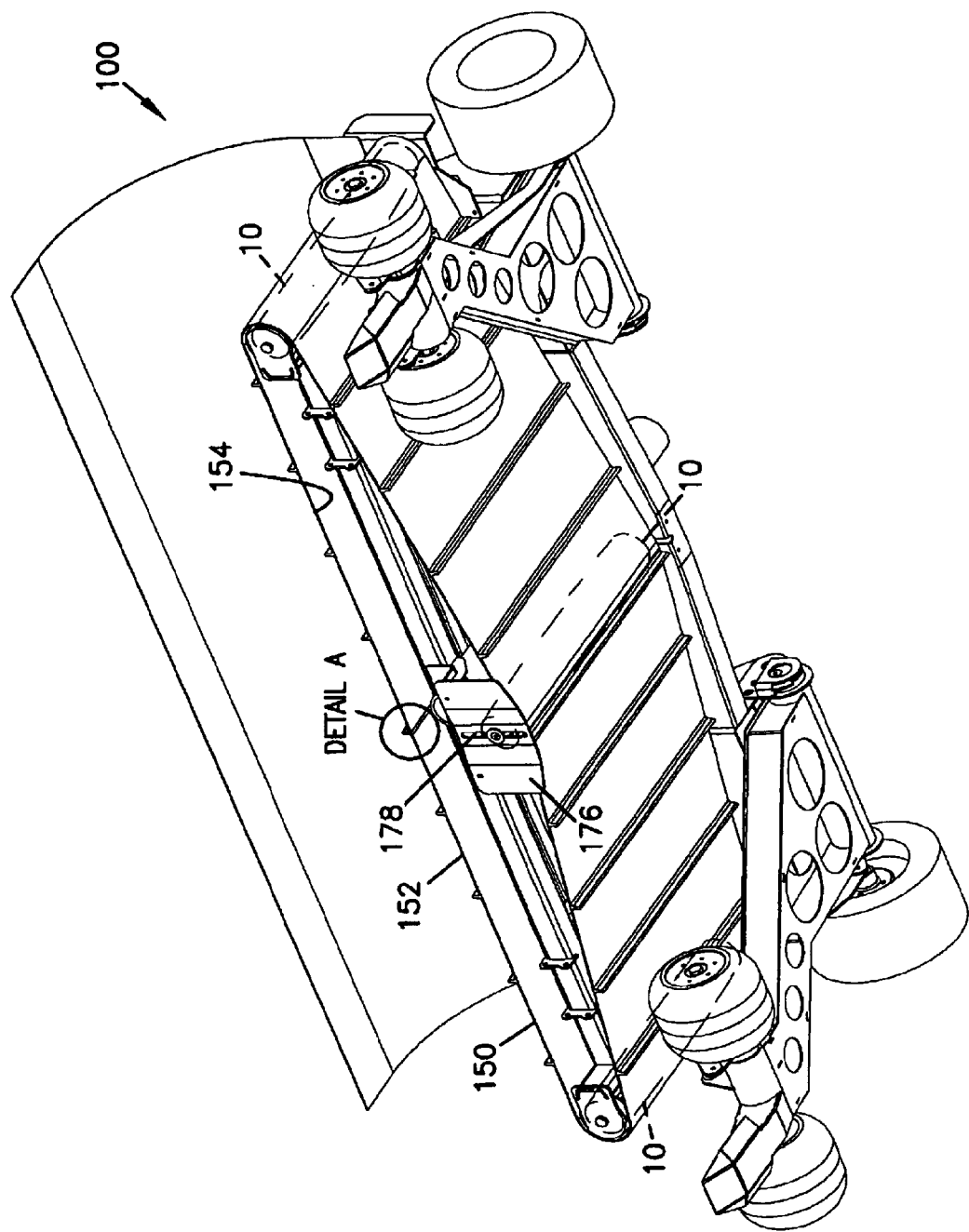
FIG. 1 is bottom, front perspective view of an embodiment of a conveyor system including a first embodiment of a bladed pulley in accordance with the principles of the present disclosure.
Figure 2:
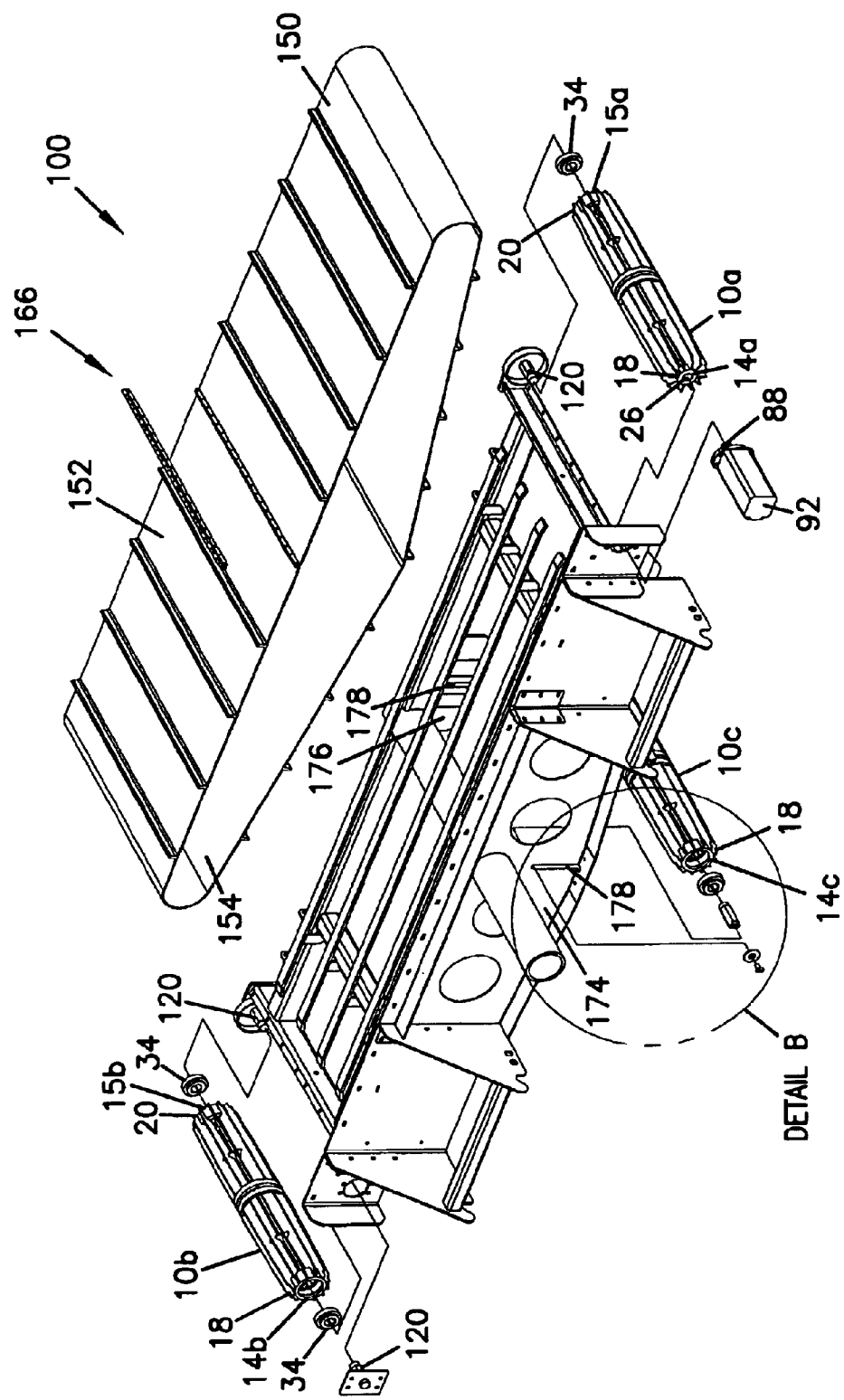
FIG. 2 is a partially shown, exploded top, rear perspective view of the conveyor system of FIG. 1.

FIGS. 1 and 2 illustrates one conveying arrangement 100 that can be used on a windrow merger machine. The arrangement includes a conveyor belt 150 and a plurality of bladed pulleys 10. In use with the windrow machine, the bladed pulleys 10 are used in combination with the conveyor belt 150 to transfer plant crops, such as hay, alfalfa, or straw, for example, from one conveyor belt to another, or to equipment where the plant crop is processed.

The plant crop is transferred along a top outer surface 152 of the belt 150. In typical arrangements, the belt 150 travels around at least two pulleys 10. Commonly, one of the pulleys is a drive pulley and the other a follower or an idler pulley. Pulley and conveyor arrangements generally require some type of tensioning device to assist in assembling the conveyor belt and provide adjustment for proper belt tensioning and belt tracking. Belt tracking is a term referring to a belt's tendency to move side to side or to heavily crowd one side of the pulley. In some arrangements either the drive pulley or the idler pulley of the conveyor are adjustable to set or adjust belt tension. In the illustrated arrangement of FIG. 2, three pulleys are provided: a fixed drive pulley 10*a*, a fixed idler pulley 10*b*, and a tensioning pulley 10*c*. The tensioning pulley 10*c* is mounted at each end to slotted support structures 174, 176. The slotted support structures 174, 176 include slots 178 configured to position the tensioning pulley 10*c*. In the illustrated embodiment, the tensioning pulley 10*c* is freely supported within the slots 178 such that belt tension is provided by the weight of the pulley (i.e. the tensioning pulley is a gravity tensioning pulley). It is also contemplated that the tensioning pulley can be configured with a securing arrangement configured to secure the pulley 10*c* at any position along slots 178 of the support structures 174, 176 to increase or lessen the tension in the conveyor belt 150.

Figure 10:
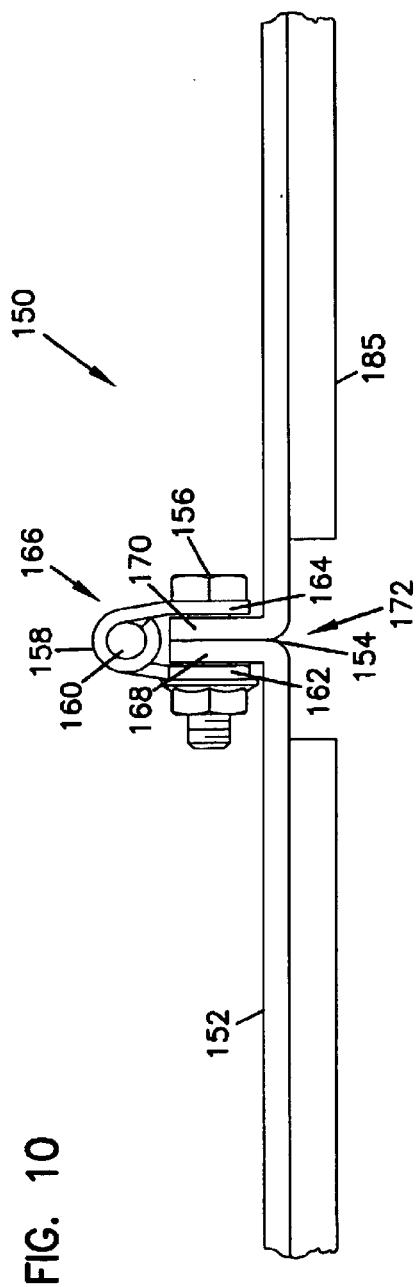
FIG. 10 is an enlarged, side elevational, diagrammatic representation of Detail A shown in FIG. 1, illustrating a connection of a conveyor belt in accordance with the principles of the present disclosure.
Figure 11:
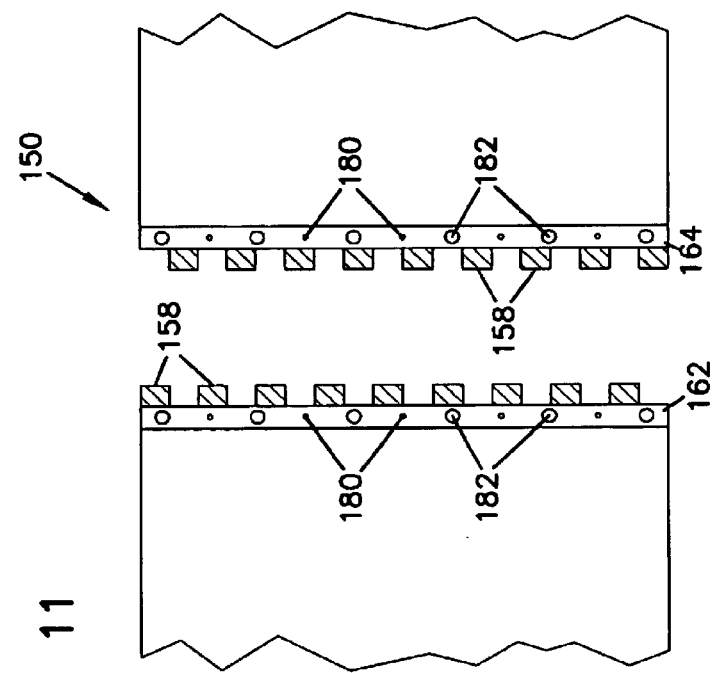
FIG. 11 is a top plan, diagrammatic representation of the conveyor belt shown in FIG. 10.

Referring now to FIG. 10, the conveyor belt 150 of the present invention includes a seam or union 172 at which first and second ends 168 and 170 of the belt 150 are joined. The union 172 has a hinge connection 166 including a first hinge member or extension 162 fastened to the first end 168 of the belt 150, and a second hinge member or extension 164 fastened to the second end 170 of the belt. The first and second extension 162, 164 may be fastened to the first and second ends 168, 170 by rivets (not shown), for example. Each of the first and second extensions 162, 164 includes lacing or a plurality of eyelets 158 (FIG. 11) that mesh when the ends are connected.

In use, the belt 150 is positioned about the pulleys 10*a*–10*c* and the ends 168, 170 are brought together to mesh the eyelets 158 of each extension 162, 164. A pin 160 (FIG. 10) is inserted within each eyelet 158 of the meshed first and second extensions 162, 164. At this point, the belt has slack to allow a user to adjust the positioning of the belt 150 in relation to the pulleys 10*a*–10*c*. The tensioning pulley 10*c* can then be positioned within the slots 178 of the support structures 174, 176 to tension the belt by taking-up any undesired slack.

When the belt is properly positioned in relation to the pulleys and the belt is adequately tensioned, the final belt length is accomplished by folding or pivoting the extensions 162, 164 toward one another (as shown in FIG. 10). Bolts 156 are inserted through holes 182 formed in the extensions 162, 164 of the hinge connection 166 and ends 168, 170 of the belt 150. The bolts 156 are secured such that an inner surface 154 of each of the ends 168, 170 is in contact. This hinge connection 166 permits a single user to easily install and adjust the conveyor belt 150 while providing a strong connection along the union 172 of the ends 168, 170.

Figure 3:
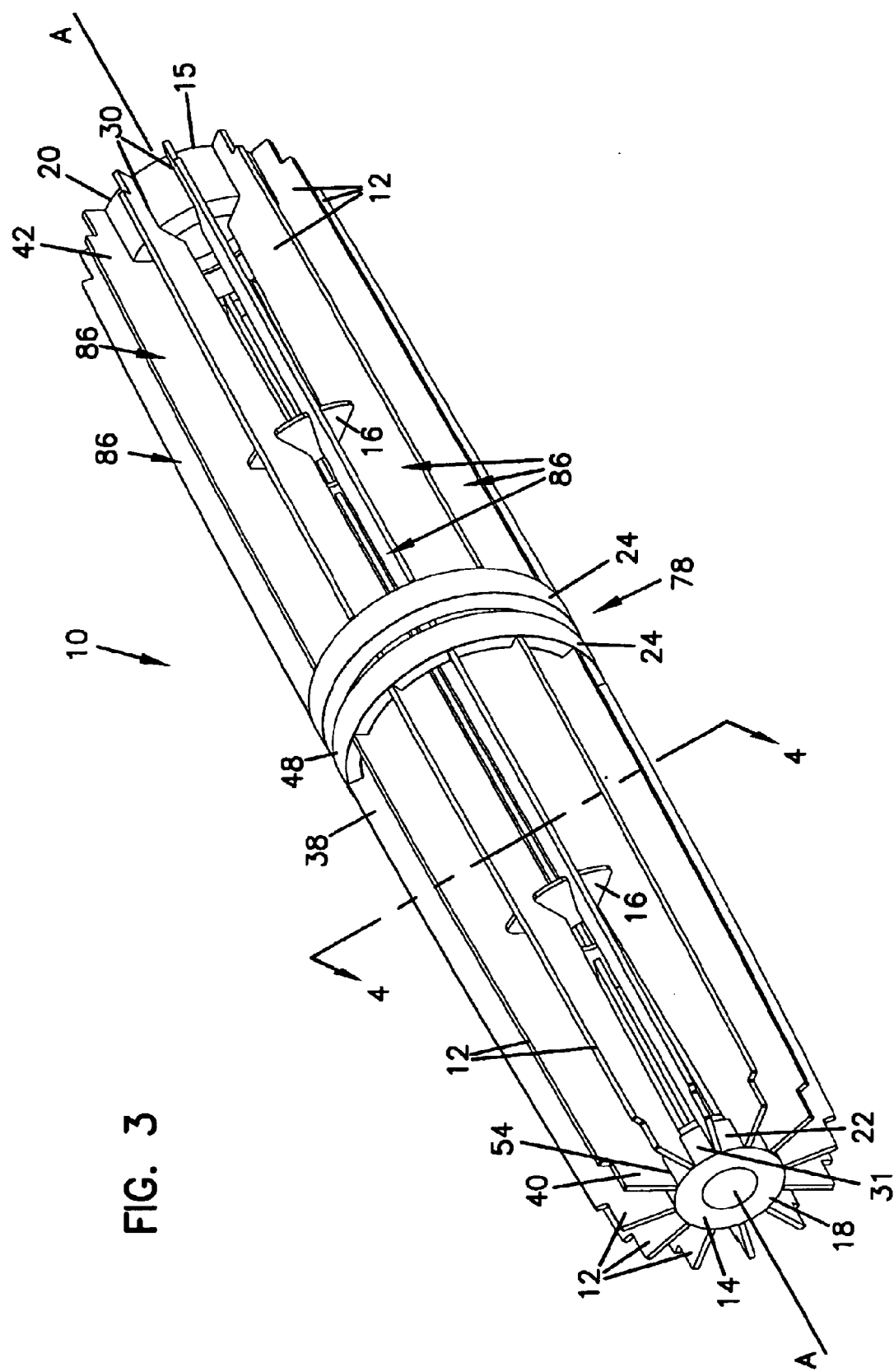
FIG. 3 is a perspective view of the first embodiment of the bladed pulley in accordance with the principles of the present disclosure.

Referring now to FIG. 3, the bladed pulley 10 of the present invention provides several advantages over conventional pulley designs. One advantage is that the bladed pulley 10 includes a plurality of blades 12 arranged and configured to chop up fallen material that would otherwise entangle or wrap around conventional pulleys. The bladed pulley 10 of the present invention further has no central shaft running from one end to the other end. Because there is no central shaft, the chopped up material can sift through the open blade design and fall free from the pulley. Yet another advantage of the present bladed design is that the disclosed blade configuration securely grips the inner surface 154 (FIGS. 1 and 2) of the conveyor belt 150 for improved drive traction. These and other advantages are discussed in greater detail hereinafter.

II. Structural Components of the First Bladed Pulley Embodiment

The first bladed pulley embodiment 10 illustrated in FIG. 3 has a longitudinal axis A—A extending generally from a first end 18 to a second end 20. The bladed pulley 10 includes a plurality of blades 12 (e.g. twelve blades) projecting outward from the longitudinal axis A—A and extending from the first end 18 to the second end 20 of the pulley 10. Orienting bulkheads 16 are provided to orient and properly space the blades at intervals about the longitudinal axis A—A.

The bladed pulley 10 in accordance with the principles disclosed has an open bladed design. In an open bladed design, the bladed pulley 10 is not of a solid, enclosing construction, rather the bladed pulley 10 includes a plurality of blades 12 defining spaces or open regions 86 about the circumference of the pulley 10. The open regions extend into a central open volume 56 (clarified by a dashed line shown in FIG. 4) from which the plurality of blades 12 projects outward. The central open volume 56 is generally defined by inner edges 54 (see also FIG. 6) of the blades 12 and first and second bulkheads or hubs 14, 15.

In a preferred embodiment, the bladed pulley 10 does not include a central shaft extending through the open volume 56. Rather, the open volume 56 is generally free from obstructions to permit material to fall through the bladed pulley and reduce the likelihood of material build up and equipment downtime. With a volume generally free from obstructions, the center volume has no longitudinally extending structure, such as a shaft, about which material is likely to become entangled. In other words, the center volume is primarily open so that material passes through the center volume and is discarded or cleared from the pulley by passing through the open regions 86 between the blades 12.

Figure 5:
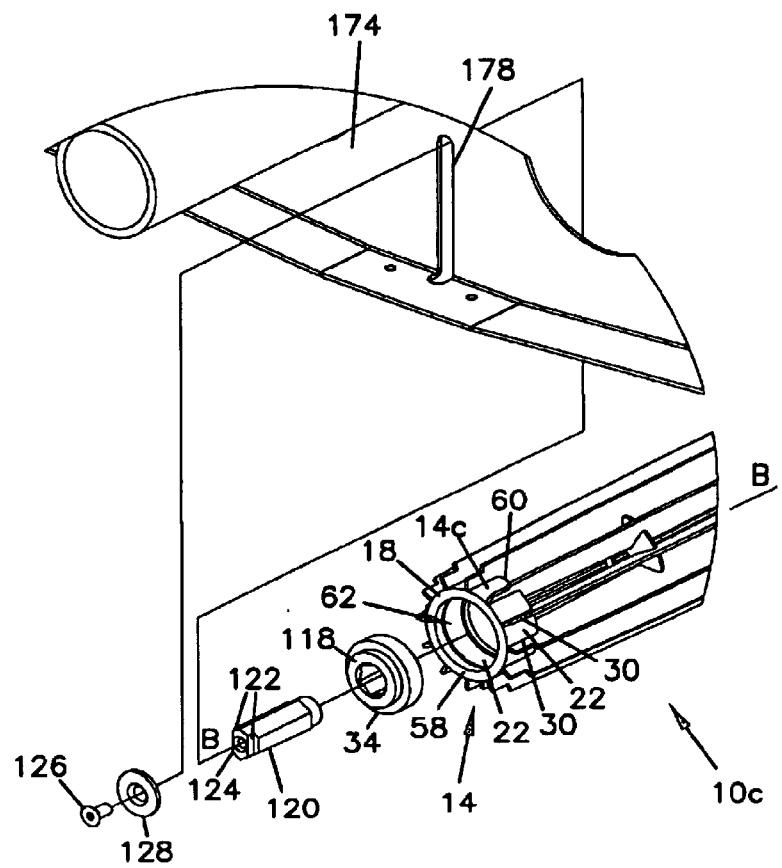
FIG. 5 is an enlarged view of detail B of FIG. 2, showing a first embodiment of a hub in accordance with the principles of the present disclosure.

As best shown in FIGS. 2 and 5, the first bulkhead or hub 14 of the bladed pulley is positioned adjacent to the first end 18 of the bladed pulley 10. The second bulkhead or hub 15 is positioned adjacent to the second end 20 of the bladed pulley 10. In the illustrated embodiment of FIG. 2, the conveying arrangement 100 includes a bladed pulley that functions as a drive pulley 10a. The drive pulley 10a is driven by a drive shaft 88 of a motor 92 that mechanically rotates or drives the bladed drive pulley 10a. When the bladed pulley 10 is configured as the drive pulley 10a, the pulley includes a drive hub 14a and a bearing hub or follower hub 15a. It is contemplated that other embodiments may include two drive hubs. Similarly, when the bladed pulley is configured as an idler or tensioning pulley, the bladed pulley embodiment may include two follower hubs. It is contemplated that a variety of drive/follower hub arrangements can be used in any of the drive, idler, or tensioning pulley arrangements.

Referring now to FIG. 5, one embodiment of the first hub 14, functioning as a follower hub 14c, is illustrated. In general, each of the hubs 14a–c, 15a–c is similarly constructed including a central portion 22 having a first end 58 that faces outward from the central volume 56 of the bladed pulley and an opposite second end 60. A central bore 62 extends through the hubs 14a–c, 15a–c from the first end 58 to the second end 60. The central bore 62 has a longitudinal axis B—B.

The central portion 22 of follower hub 14c includes a plurality of slots 30 (see also FIG. 3, hub 15). The number of slots 30 corresponds to the number of blades 12 of the bladed pulley. Each of the slots 30 has a width that is sized and configured for receipt of the blades 12. In an alternative embodiment, the hubs can include flanges (not shown) radially extending from the central portion 22. The flanges can be located at either or both of the first and second ends 58, 60 of the central portion 22 and include a plurality of slots corresponding to the number and size of the blades.

In a hub constructed as a follower hub 14c (FIG. 5) the central bore 62 of the hub 14c has an internal diameter sized and configured to receive a bearing 34. The central bore 62 can be sized and configured to receive many types of bearings, such as ball or journal bearings or bushings. Preferably, the central bore 62 is sized and configured to receive bearings 34 that are of a standard size and type, so that a user can easily obtain replacement bearings for maintenance purposes.

An adapter portion 118 is positioned within the bearing 34 to permit the bladed pulley to freely rotate about the longitudinal axis B—B of the hub 14c. The adapter portion 118 is configured to receive an axle 120. In the illustrated embodiment, the adapter portion 118 is structured in correspondence to a hex-shaped axle 120.

Unlike the follower hub 14c, the central bore 62 of the drive hub 14a, shown in FIG. 2, includes drive structure 26 to rotationally drive or propel the bladed pulley, rather than a bearing and adapter portion that permits free rotation. In the illustrated embodiment the drive structure 26 is an internal hex concentrically configured along the longitudinal axis B—B of the hub 14a. Other drive structure for transferring rotational power to the hub, and therein to the bladed pulley, may be used. For example, the drive structure may include a spline, a keyway, or a flanged joint. Similarly, the adapter portion of the follower hub can include other adapter structure configured to correspond to other types of axle configurations.

FIG. 3 illustrates one embodiment of the bladed pulley 10 including a drive hub 14 and a follower hub 15. As can be seen, the central portions 22 of the hubs 14, 15 are configured with different outer diameters. In particular, the follower hub 15 is sized to accommodate a bearing 34 (FIG. 5). The drive hub 14 need be sized only to accommodate a drive shaft 88 (FIG. 2). Thus, in this embodiment, the drive hub 14 has an outer surface 31 to which the inner edge 54 of the blades 12 can be secure (e.g. welded). The follower hub 15 is configured with slots 30 that receive the other end of each blade 12. Preferably the outer surface 31 of the drive hub 14 and the slots 30 of the follower hub 15 are correspondingly arranged and configured to position the inner edges 54 of the blades 12 in a substantially parallel relationship with the longitudinal axis A—A of the pulley 10.

Referring back to FIG. 5, the axle 120 can include notches 122 that correspond to the slots 178 of the support structure 172, 174. The notches fix the axles in a non-rotational position, yet permit the axles 120, and the bladed pulley 10c, to freely float within the slots 178 for tensioning purposes, as previously described. The axles 120 of the tensioning pulley 10c can include a threaded hole 124 for receipt of fasteners 126 (only one shown) that secure that tensioning pulley 10c within the slots 178. In the illustrated embodiment, a washer 128 is positioned between the fastener 126 and the support structures 172, 174. Other types of structure that function to secure the tensioning pulley 10c within the slots 178 of the support structures can be used in accordance with the principles disclosed.

Referring back to FIG. 3, the blades 12 of the bladed pulley 10 extend from the first hub 14 to the second hub 15. In a preferred embodiment, the blades 12 are of a monolithic construction. In other words, the blades 12 are designed to extend from the first hub 14 to the second hub 15 without segmentation. This design permits ease in manufacture as there is no added process to create joints or mating seams. This design also permits ease in assembly as the blades are unitary and not required to be fit or joined together.

Referring now to FIG. 6, one embodiment of a blade 12 in accordance with the principles disclosed is illustrated. The blade 12 has a length L1, a width W1, and preferably a tapering height H1 to H2. The length L1 of the blade extends between a first end 40 of the blade and a second end 42 of the blade. In use with a merging machine, for example, the length L1 of the blade 12 is typically within the range of 24 and 48 inches; preferably, the length L1 of the blade 12 is about 34 inches. The width W1 of the blade is defined between a first planar surface 94 and a second opposite planar surface 96. Typically the width W1 of the blade 12 is within the range of 0.100 and 0.200 inches; preferably, the width W1 of the blade 12 is about 0.134 inches.

The blade 12 defines a crown profile 68 and tapers from a central region 38 to the ends 40, 42 of the blade 12. The height H1, H2 is defined between an inner edge 54 and an outer edge 66 of the blade 12. In the illustrated embodiment, the height H1 at the central region 38 of the blade 12 is within the range of 2.0 and 4.0 inches; preferably about 2.25 inches. The height H2 at each of the ends 40, 42 is within the range of 1.0 and 3.0 inches; preferably about 1.625 inches. In the shown embodiment, the arcs or tapers of the blades 12 have an angular dimension A of between 0.5 degrees and 1.0 degrees.

Referring still to FIG. 6, the crown profile 68 of the blade 12 is located at the central region 38 of the blade 12 along the outer edge 66. The crown profile 68 eliminates the need for expensive machining used to provide a tracking profile as found on most conventional pulleys having a solid cylindrical surface. In particular, the crown profile 68 includes a raised drive edge 98 at the central region 38 of the blade. The drive edge 98 provides a line contact that engages the inner surface 154 of the conveyor belt 150 to drive the belt with minimal slip. The drive edge 98 further maintains proper alignment of the belt.

As illustrated in FIG. 3, the bladed pulley 10 preferably includes twelve blades 12. It is contemplated that more or fewer blades can be used in accordance with the principles disclosed. In particular, more blades can be added in applications where the material is more difficult to chop or is generally smaller in size so that the material easily falls through the open volume between the blades. In the alternative, fewer blades can be used in applications where the material is easier to chop or is generally larger in size requiring more of an open design to permit the material to fall through the blades 12 and free from the pulley 10.

The orienting bulkheads 16 of the bladed pulley 10 are provided to orient and properly space the blades 12. In one preferred embodiment, illustrated in FIG. 7, the orienting bulkhead 16 includes a wheel-shaped disc 84 having a plurality of bulkhead slots 44. Preferably, the number of bulkhead slots 44 corresponds to the number of blades 12 of the bladed pulley 10. The bulkhead 16 illustrated in FIG. 7 also includes a central through hole 46 defining a central axis C—C. The central through hole 46 may or may not be formed within the bulkhead, as the bladed pulley 10 preferably operates without a central shaft. Yet, the bulkhead may be configured with the central through hole 46 in applications where a central shaft is desired, or in applications where weight reduction is advantageous.

The bulkhead slots 44 extend radially away from the central axis C—C of the bulkhead 16. In particular, the slots 44 extend from a slot seat 72 adjacent the central through hole 46 to an outer perimeter 76 of the bulkhead 16. Each of the slots has a width that is sized and configured for receipt of one of the blades 12. The slot seats 72 of the bulkhead 16 are located a distance r2 from the central axis C—C of the bulkhead 16.

The slots 44 of the bulkhead 16 position the blades 12 about the central axis C—C of the bulkhead 16 at predetermined intervals B. Preferably the intervals B are uniformly spaced about the central axis C—C. In the illustrated embodiment, the slots 44 are spaced at intervals B of approximately 30 degrees. For embodiments having a number of blades different than that of the illustrated embodiment, the intervals may be greater than or less than approximately 30 degrees. In the alternative, the intervals may be non-uniform or varied at particular locations about the longitudinal axis of the pulley in applications where such an arrangement is advantageous. For ease of manufacture of the orienting bulkhead 16, the slots can be formed by a laser cutting process. Other manufacture processes, however, that angularly orient and position the slots with sufficient accuracy to thereby orient and position the blades, may be used.

Referring now to FIGS. 3 and 8, the bladed pulley 10 further includes rings 24 positioned adjacent one another at the central region 38 of the blades 12. The rings 24 define a Vee-guide groove 48 that corresponds to guide structure (not shown) formed on the inner surface 154 of the conveyor belt 150 (FIGS. 1 and 2).

III. Assembly of the First Bladed Pulley Embodiment

The bladed pulley 10 is designed to: ease efforts in manufacture and assembly, maintain structural integrity and accuracy, and lessen the overall weight of a pulley. For example, the monolithic construction of the blades 12 assists in the manufacture of the bladed pulley; the orienting bulkhead 16 and slotted hub flanges 14, 15 maintain the structural integrity and blade position accuracy of the pulley; and the open volume design reduces the overall weight of the bladed pulley 10. In addition to these exemplary advantages, the bladed pulley is designed for ease of assembly.

Figure 4:
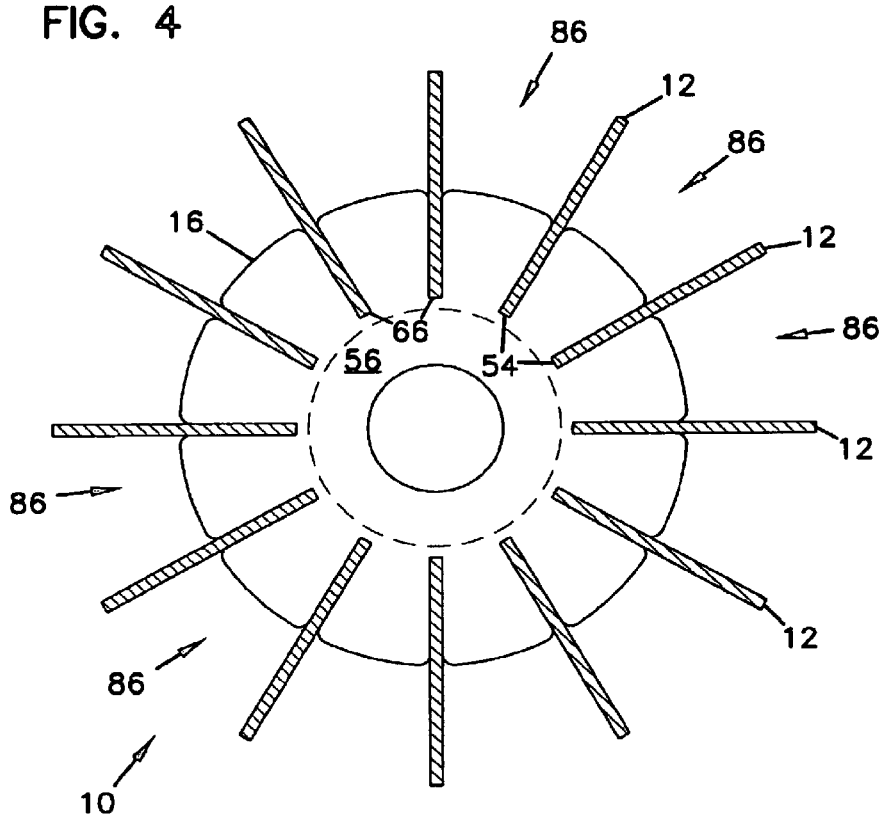
FIG. 4 is a cross-sectional view of the bladed pulley of FIG. 3, taken along line 4—4.

Referring now to FIGS. 3 and 8, the bladed pulley 10 is provided with two bulkheads 16. The bulkheads 16 are positioned approximately halfway between a midpoint 78 of the blades 12 and the ends 40, 42 of the blades 12. Each of the blades 12 is positioned within the bulkhead slots 44 such that the inner edge 54 of the blade 12 contacts the slot seat 72 (FIGS. 4 and 7).

Each of the blades 12 is secure in a position relative to the bulkheads 16. In one method of assembly, the blades 12 and bulkheads 16 may be permanently welded together. In another method of assembly, the blades and bulkheads can be detachably, or permanently, secured together with conventional fasteners, such as bolts or rivets. It is further contemplated that a separate bracket or ring may be used to couple the blades and bulkheads together in fixed relation.

As shown in FIG. 8, an assembly tool 50 can be used to properly align the blades 12 when coupling the blades 12 in fixed relation to the orienting bulkheads 16. The assembly tool 50 has a central opening 90 (FIG. 9) and a plurality of slots 52. The slots 52 radially extend from the central opening 90 and preferably correspond to the number of blades 12 of the bladed pulley 10. As the blades 12 are inserted within the each of the bulkhead slots 44, the blade may also be inserted within the assembly tool slots 52 (FIG. 8). The assembly tool 50 can be slid along the lengths of the blade or blades 12 to a position that stabilizes and properly orients the blades relative to one another. In one method of assembly, the tool 50 is used to position each of the blades 12 prior to coupling or securing all the blades 12 in fixed relation to the bulkheads 16. In another method, the tool 50 is used to position and secure the blades one at a time.

Still referring to FIG. 8, when each of the blades 12 is coupled to the bulkheads 16, the assembly tool 50 can be slid off the blades 12. The blades 12 extend radially from the central axes C—C of the bulkheads 16. The central axes C—C of the bulkheads 16 are preferably coaxially aligned to define the longitudinal axis A—A of the bladed pulley 10 (See FIG. 3).

To position the first hub 14, each of the slots 30 of the central portion 22 is aligned with the first ends 40 of the each blade 12. The blade ends 40 are slid within the slots 30 and can be secured to the hub 14 by weldments. The second hub 15 is similarly assembled to the second ends 42 of the blades 12. Preferably the first and second hubs 14, 15 are coaxially aligned with the central axes C—C of the bulkheads 16. In particular, the longitudinal axes B—B of the hubs 14, 15, and the central axes C—C of the bulkheads, coaxially align to define the longitudinal axis A—A of the bladed pulley 10.

The rings 24 are positioned about the outer circumference of the bladed pulley 10. In particular, the rings 24 are placed within a notch 47 (FIG. 6) formed in the outer edges 66 of the blades 12. In the illustrated embodiment of FIG. 8, the rings 24 include a circumferential surface 110, a groove surface 112, and a locating surface 114. In assembly, each ring is positioned about the blades 12 so that the locating surface 114 contacts a notch corner 49 (FIG. 6) of the blade notch 47. The notch corner 49 maintains the placement of the rings 24. The rings 24 are seamed or secured by conventional methods. Each of the groove surfaces 112 of the rings 24 partially defines the Vee-guide groove 48 that receives a guide rib 185 (FIG. 10) of the conveyor belt 150. The Vee-guide groove 48 assists in maintaining proper position of the belt 150 in relation to the blade pulley 10.

In use, the bladed pulley 10 easily mounts to the axles or drive shafts of equipment. The bladed pulley is designed so that an operator can easily exchange one bladed pulley 10 for another by simply removing the pulley 10 from the axles 120 or shafts 88 and installing a replacement pulley. As shown, neither the axle 120 nor the drive shaft 88 extend through the length of the bladed pulley 10 or extend through the open volume of the bladed pulley 10, making replacement of the pulley a simpler task.

IV. Structural Components of a Second Bladed Pulley Embodiment

Figure 12:
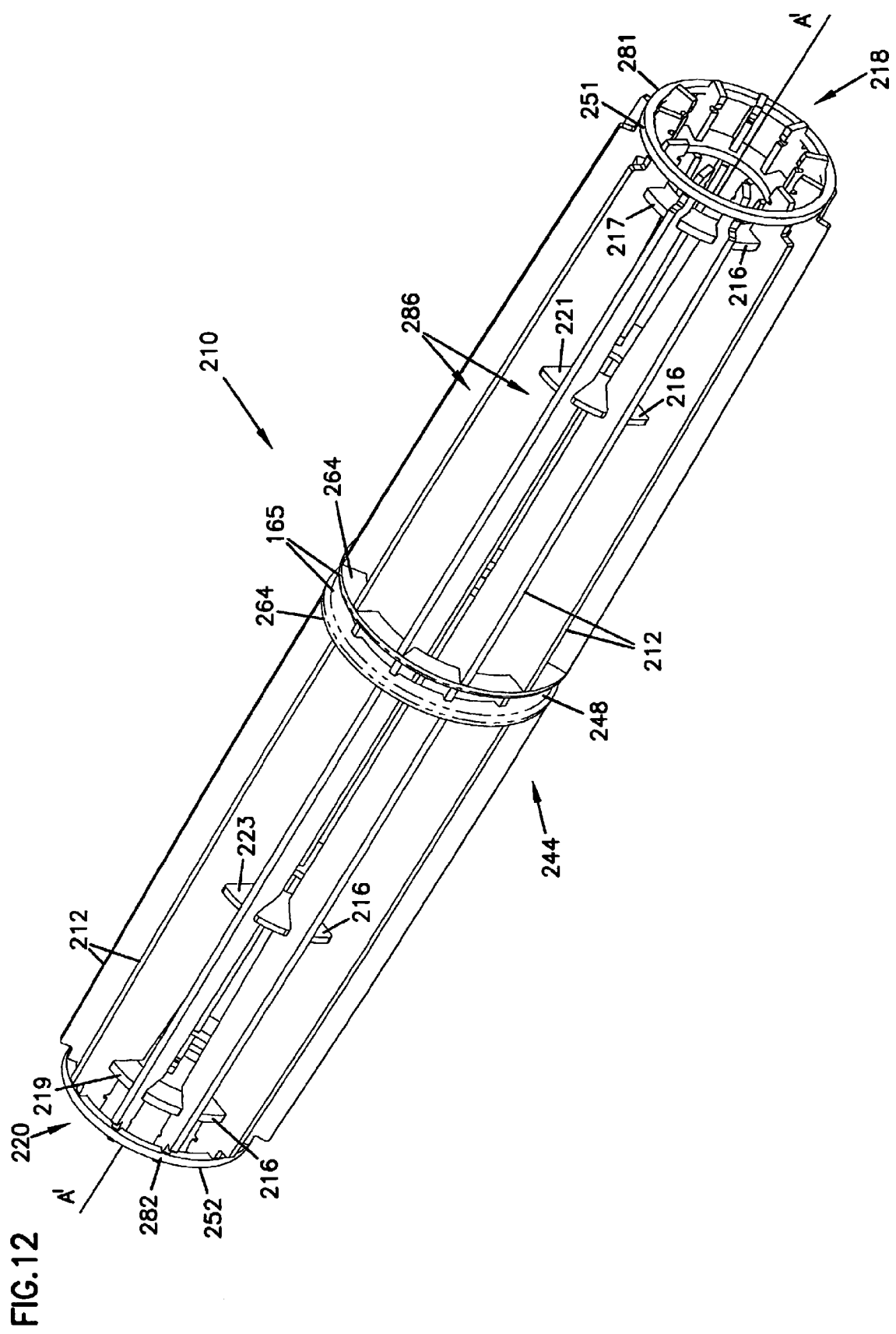
FIG. 12 is a perspective view of a second embodiment of a bladed pulley in accordance with the principles of the present disclosure.
Figure 13:
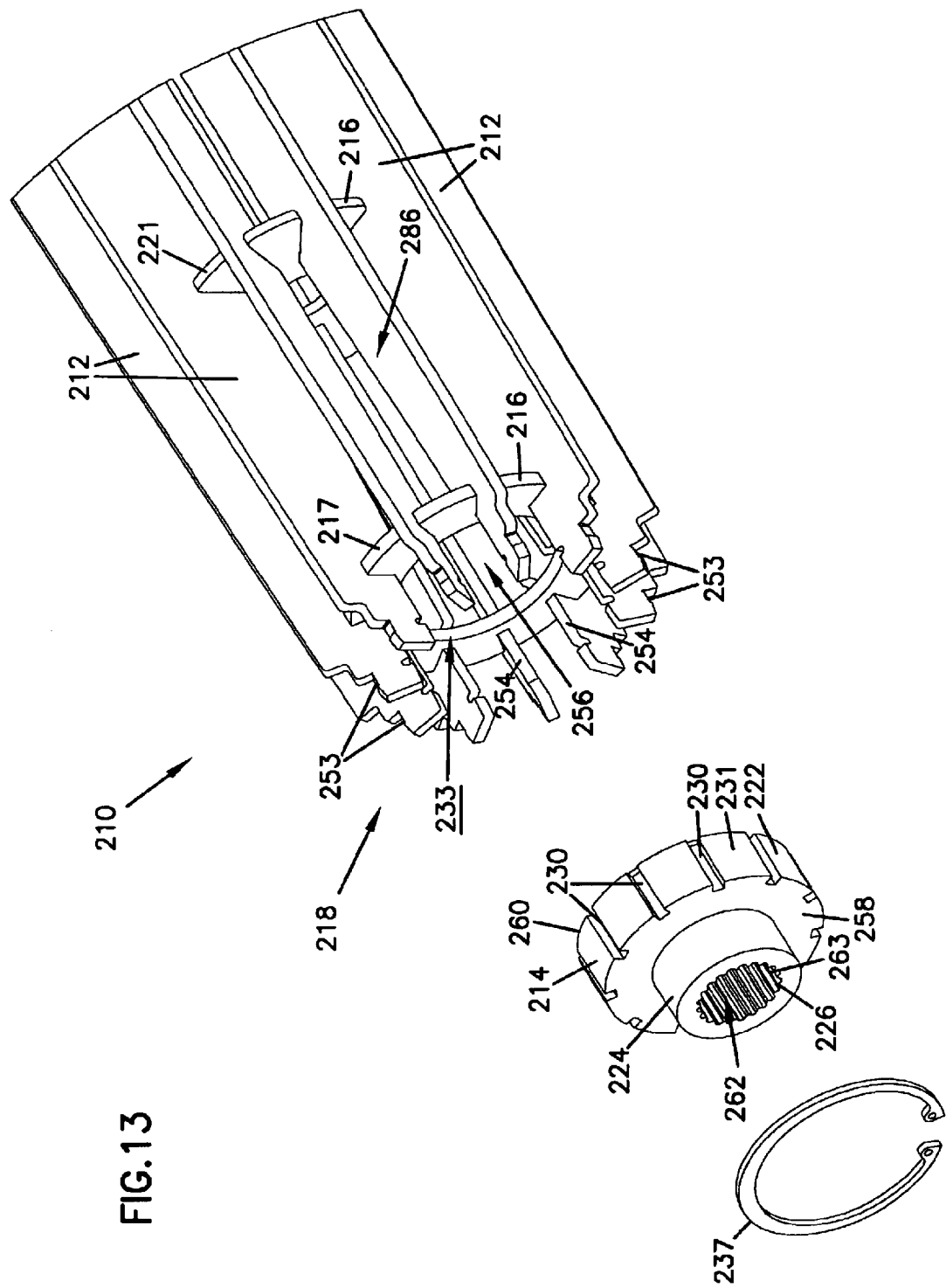
FIG. 13 is a exploded, perspective view of an end of the bladed pulley shown in FIG. 12.

A second bladed pulley embodiment 210 for use with a conveyor belt system is illustrated in FIGS. 12–17. As shown in FIG. 12, the second bladed pulley embodiment 210 has a longitudinal axis A'—A' extending generally from a first end 218 (FIG. 12) to a second end 220 (FIG. 13). The bladed pulley 210 includes a plurality of blades 212 (e.g. eleven blades) projecting outward from the longitudinal axis A'—A' and extending from the first end 218 to the second end 220 of the pulley 210. Orienting members or bulkheads 216 are provided to orient and properly space the blades at intervals about the longitudinal axis A'—A'.

The bladed pulley 210 in accordance with the principles disclosed has an open bladed design. The plurality of blades 212 defines spaces or open regions 286 about the circumference of the pulley 210. The open regions 286 extend into a central open volume 256 (FIG. 2) from which the plurality of blades 212 projects outward.

Similar to the previous embodiment, the bladed pulley 210 preferably does not include a central shaft extending through the open volume 256. Rather, the open volume 256 is generally free from obstructions to permit material to fall through the bladed pulley and reduce the likelihood of material build up and equipment downtime.

In this alternative embodiment, the orienting bulkheads 216 include outer bulkheads or support plates 217, 219 and inner bulkheads 221, 223. Still referring to FIG. 12, the outer bulkheads 217, 219 are located adjacent to the first and second ends 218, 220 of the bladed pulley 210. The inner bulkheads 221, 223 are located between the outer bulkheads 217, 219.

Figure 14:
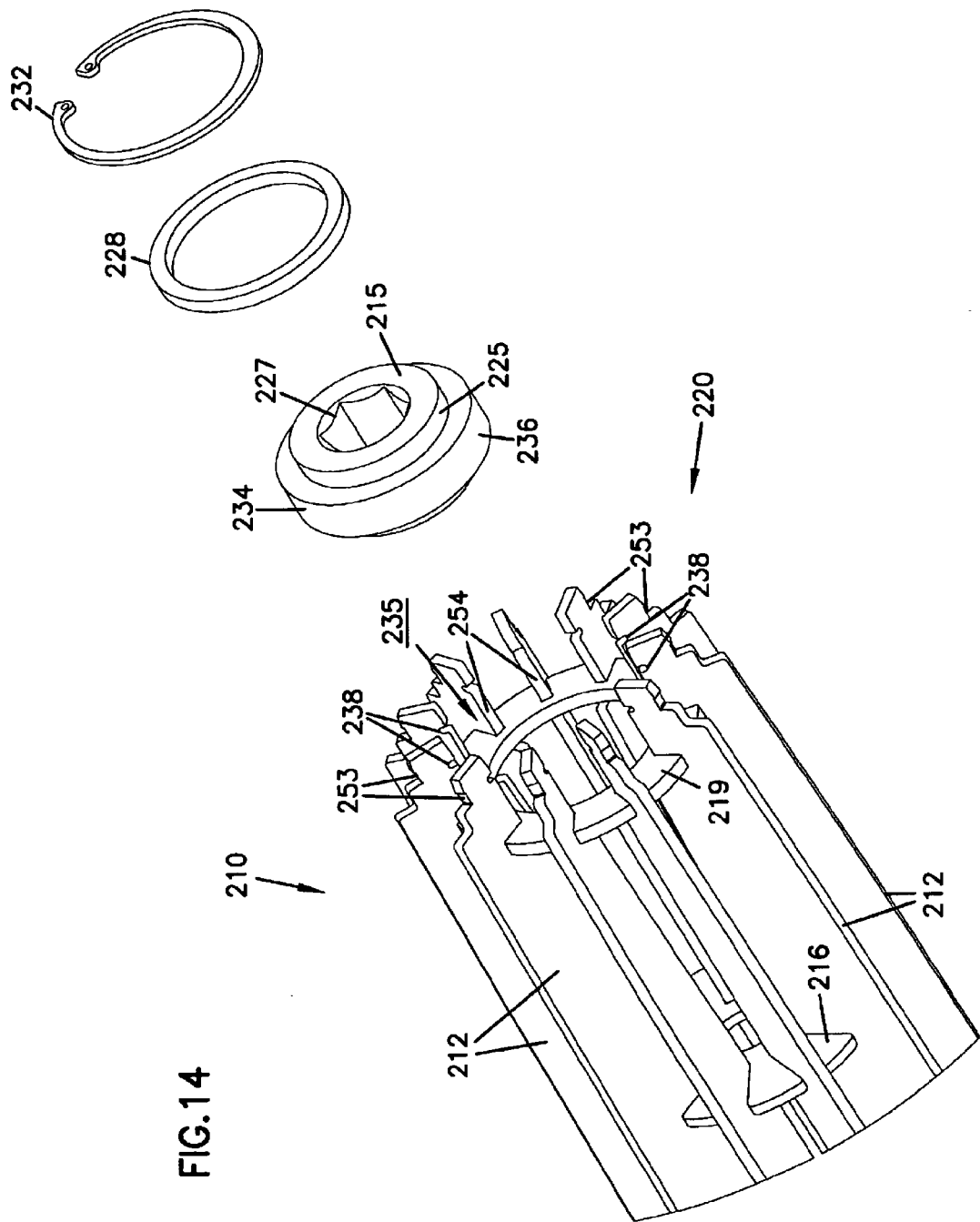
FIG. 14 is a exploded, perspective view of an opposite end of the bladed pulley shown in FIG. 13.

Referring now to FIGS. 13 and 14, a first hub 214 of the bladed pulley is positioned adjacent to the first end 218 of the bladed pulley 210. A second hub 215 is positioned adjacent to the second end 220 of the bladed pulley 210. The first and second hubs 214, 215 are located adjacent to the outer bulkheads 217, 219.

In the illustrated embodiment, the bladed pulley 210 functions as a drive pulley. As shown in FIG. 13, the first hub 214 includes drive structure 226 for receipt of the drive shaft 88 of the motor 92 (FIG. 2). The first hub 214 also includes a major portion 222 and a minor portion 224. The major portion 22 has a first surface 258 and an opposite second surface 260. The first surface 258 faces outward from the central volume 256 of the bladed pulley.

The minor portion 224 of the first hub 214 extends outward from the first surface 258 of the major portion 222. The minor portion 224 partially defines the drive structure 226 of the first hub 214. The drive structure 226 includes a central bore 262 configured to rotationally drive or propel the bladed pulley 210. In the illustrated embodiment, the drive structure 226 includes an internal spline arrangement 263 Other drive structure for transferring rotational power to the hub, and therein to the bladed pulley, may be used. For example, the drive structure may include an internal hex, a keyway, or a flanged joint. In addition, the drive structure may include an external spine or drive arrangement that couples to an adapter structure (not shown) to transfer rotational power from the motor 92 to the first hub 214.

The major portion 222 of the drive hub 214 has an outer diameter 231 to which inner edges 254 of the blades 212 are engaged. In particular, the first hub 214 includes slots 230 configured to receive the blades 212. Each of the slots 230 extends from the first surface 258 to the second surface 260 about the circumference of the major portion 222. The blades may be affixed within the slots 230 of the hub 214 by either a welding process or by clamping or securing the blades 212 about the hub, as will be described in greater detail hereinafter. The number of slots 230 corresponds to the number of blades 212 of the bladed pulley. Preferably the slots 230 formed in the outer diameter 231 are arranged and configured to position the inner edges 254 of the blades 212 in a substantially parallel relationship with the longitudinal axis A'—A' of the pulley 210.

In the illustrated embodiment, a snap ring 237 is used to maintain the positioning of the first hub 214 at the first end 218 of the pulley. The snap ring 237 engages grooves 238 located at the inner edges 254 of the blades 212. Other types of securing arrangement, such as set screw, keyway, or taper lock arrangements can be used to secure first hub 214 at the first end of the pulley 212 adjacent to the outer bulkhead 217.

Referring now to FIG. 14, the second hub 215 is configured as a follower hub and includes an outer diameter 225 and adapter structure 227. The adapter structure 227 is configured to receive an axle 120 (FIG. 2). In the illustrated embodiment, the adapter structure 227 is configured in correspondence to a hex-shaped axle 120.

In the illustrated embodiment, the outer diameter 225 of the second hub 215 is sized and configured for receipt within an inside diameter of a bearing 234. The outer diameter 225 of the second hub 215 can be sized and configured for use with many types of bearings, such as ball or journal bearings or bushings. Preferably, the outer diameter 225 is sized and configured to press fit within a bearing that is of a standard size and type.

The bearing 234 has an outer diameter 236. When assembled, the inner edges 254 of the blades 212 of the pulley 210 contact the outer diameter 236 of the bearing 234 to maintain the bearing in relation to the pulley 210. That is, the inner edges 254 of the blades 212 define bores 233, 235 (i.e. define the circumference of portions of a bore construction) located at each end 218, 220 of the pulley 210. As shown in FIG. 13, the first bore 233 receives the major portion 222 of the first hub 214. Referring to FIG. 14, the second bore 235 receives the bearing 234. As can be understood, the second bore 235 is sized to properly support the bearing to maintain the functionality of the bearing 234. In other words, because the bearing 234 is support only at the bearing's inner diameter by the second hub 215, the radial distance of the blades 212 in relation to the central longitudinal axis A'—A' of the pulley 210 is important in properly supporting the bearing 234.

By this design, larger bearings can be used in accord with the principles disclosed to accommodate greater pulley loads experienced in some application. That is, this design does not have the spatial constraints associated with arrangements having a hub positioned between a bearing and the outer pulley structure. Because the bearing 234 is in direct contact with the blades 212, a bearing having a larger outer diameter and greater load rating can be used.

Referring still to FIG. 14, a spacer 228 may be position adjacent the bearing 234 about the outer diameter 225 of the second hub 215. In alternative arrangement, the bearing may be of a different size (i.e. width) and the spacer may be manufactured with a width to correspond to the different-sized bearing. In particular, the spacer 228 may be manufactured in a variety of widths to accommodated use of bearings having a variety of widths. In some arrangements, the spacer may be altogether omitted. In other arrangements, the spacer 228 can be constructed to function as a seal to protect the bearing 234 from contaminants.

In the illustrated embodiment, a snap ring 232 is used to hold the spacer 228, bearing 234 and second hub 215 in position. The snap ring 232 engages grooves 238 located at the inner edges 254 of the blades. As previously described, other securing arrangements can be used to secure the spacer, bearing, and second hub at the second end 220 of the pulley 212 adjacent to the outer bulkhead 219.

Referring back to FIG. 12, the blades 212 of the bladed pulley 210 extend from the first end 218 to the second end 220 of the pulley. In a preferred embodiment, the blades 212 are of a monolithic construction. In other words, the blades 212 are designed to extend from the first end 218 to the second end 220 without segmentation. This design permits ease in manufacture as there is no added process to create joints or mating seams. This design also permits ease in assembly as the blades are unitary and not required to be fit or joined together.

Figure 15:
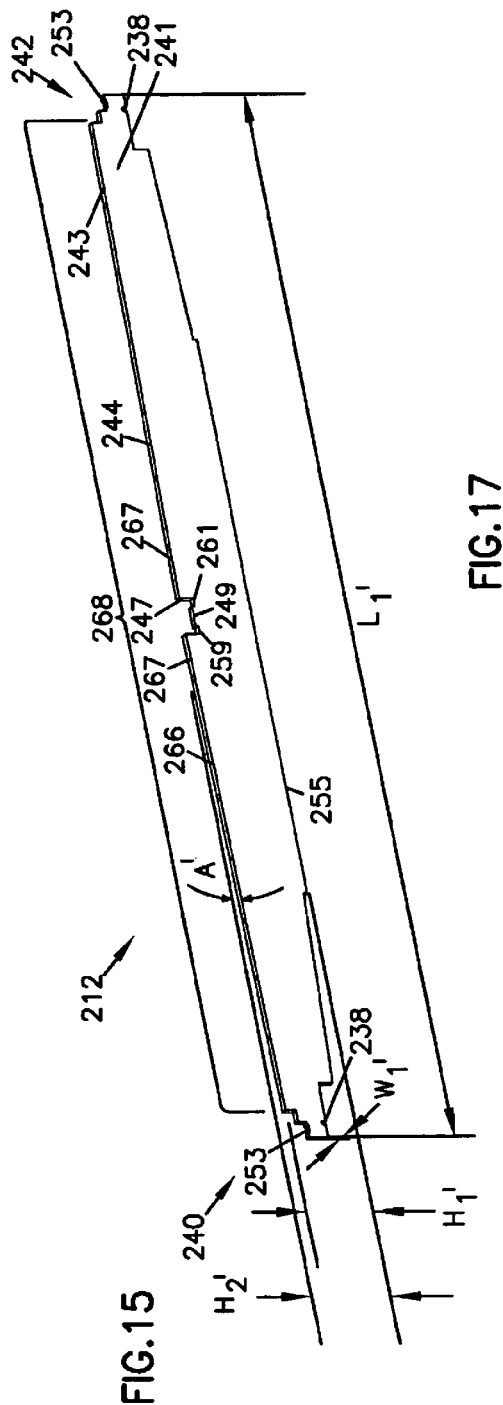
FIG. 15 is a perspective view of a blade shown in FIG. 12.

Referring now to FIG. 15, the embodiment of the blade 212 shown in the second bladed pulley embodiment 210 is illustrated. Similar to the previous embodiment, the blade 212 has a length L1', a width W1', and preferably a tapering height H1' to H2'. The length L1' of the blade extends between a first end 240 of the blade and a second end 242 of the blade. In use with a merging machine, for example, the length L1' of the blade 212 is typically within the range of 24 and 48 inches; preferably, the length L1' of the blade 212 is about 34 inches. The width W1' of the blade is defined between a first planar surface 241 and a second opposite planar surface 243. Typically the width W1' of the blade 212 is within the range of 0.100 and 0.200 inches. In this embodiment, the eleven blade arrangement accommodates a preferred blade width W1' of about 0.179 inches.

By providing an embodiment 210 with eleven blades, the width W1' of each of the blades 212 can be increased, while maintaining the overall diameter of the pulley 210 and while maintaining sufficient spacing between the blades. Increasing the width increases the structural stability of the blades to accommodate some applications where the pulley is under greater structural stresses or greater impact loads. It is contemplated that more or fewer blades can be used in accordance with these principles disclosed.

The blade 212 defines a crown profile 268 and tapers from a central region 244 to the ends 240, 242 of the blade 212. The height H1', H2' is defined between a central inner edge 255 and an outer edge 266 of the blade 212. In the illustrated embodiment, the height H1' at the central region 244 of the blade 212 is within the range of 2.0 and 4.0 inches; preferably about 2.25 inches. The height H2' at each of the ends 240, 242 is within the range of 1.0 and 3.0 inches; preferably about 1.625 inches. In the shown embodiment, the arc or taper of the blades 212 has an angular dimension A' of between 0.5 degrees and 1.0 degrees.

Referring still to FIG. 15, the crown profile 268 of the blade 212 is located at the central region 244 of the blade 212 along the outer edge 266. Similar to the previous embodiment, the crown profile 268 includes a raised drive edge 267 at the central region 244 of the blade that provides a line contact to engages and drive the conveyor belt 150 with minimal slip.

Figure 16:
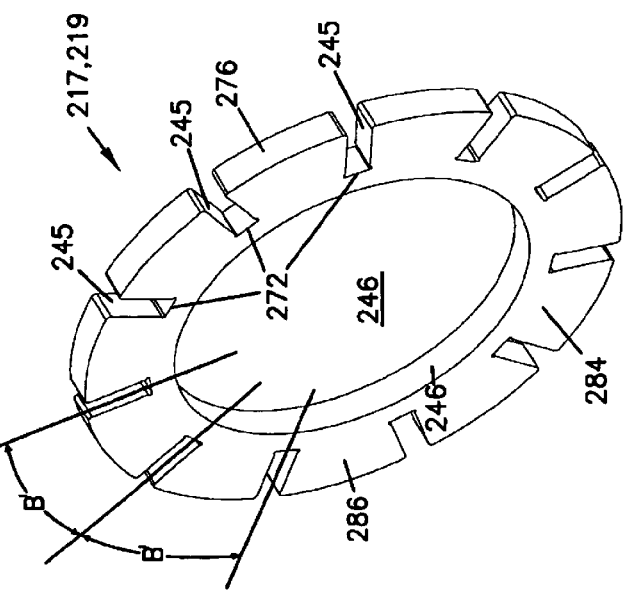
FIG. 16 is a perspective view of an outer bulkhead shown in the bladed pulley embodiment of FIG. 12.

Referring back to FIG. 12, the orienting bulkheads 216 of the bladed pulley 210 are configured to orient and properly space the blades 212. The inner bulkheads 221, 223 are similar to the bulkhead 16 previously described and shown in FIG. 7. FIG. 16 illustrates an embodiment of the outer orienting bulkheads or support plates 217, 219. The outer orienting bulkheads 217, 219 are generally a wheel-shaped disc 284 having a plurality of bulkhead slots 245. Preferably, the number of bulkhead slots 245 corresponds to the number of blades 212 of the bladed pulley 210. The bulkheads 217, 219 illustrated in FIG. 16 also include a central through hole 246. The central through hole 246 may be omitted, as the bladed pulley 210 preferably operates without a central shaft. Yet, the bulkhead may be configured with the central through hole 246 in applications where a central shaft is desired, or in applications where weight reduction is advantageous.

The bulkhead slots 245 extend radially away from the central through hole 246 of the bulkhead 217,219. In particular, the slots 245 extend from a slot seat 272 adjacent the central through hole 246 to an outer perimeter 276 of the bulkhead 217, 219. Each of the slots 245 has a width that is sized and configured for receipt of one of the blades 212.

The slots 245 of the bulkhead 217, 219 position the blades 212 of the pulley 210 at predetermined intervals B'. Preferably the intervals B' are uniformly spaced. In the illustrated embodiment, the slots 245 are spaced at intervals B' of approximately 33 degrees. For ease of manufacture of the orienting bulkhead 217, 219, the slots can be formed by a laser cutting process. Other manufacture processes, however, that angularly orient and position the slots 245 with sufficient accuracy to thereby orient and position the blades, may be used.

Referring again to FIG. 12, the bladed pulley 210 further includes rings 264 positioned adjacent one another at the central region 244 of the blades 212. The rings 264 define a Vee-guide groove 248 that corresponds to guide structure formed on the inner surface 154 of the conveyor belt 150 (FIGS. 1 and 2).

Figure 18:
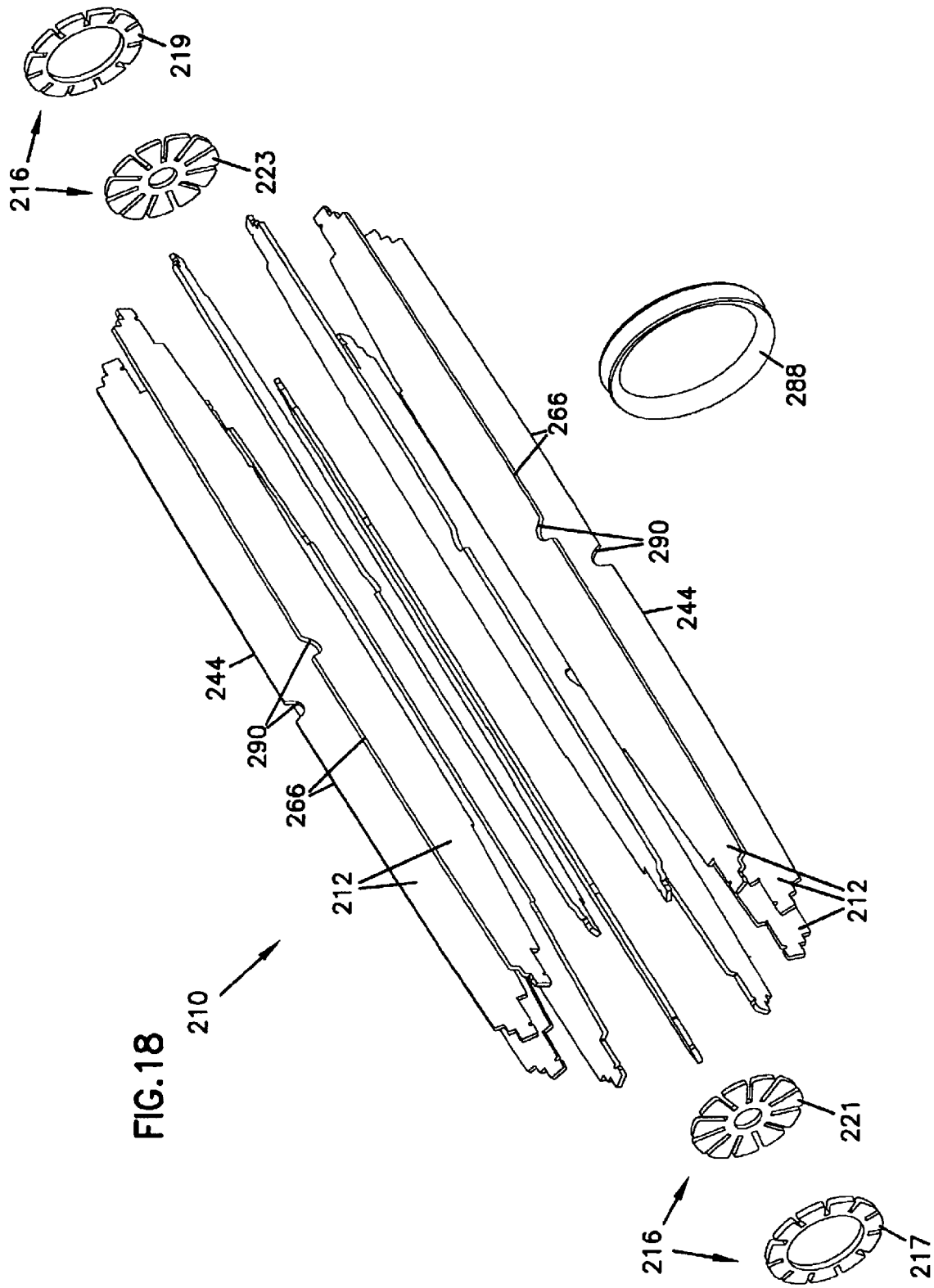
FIG. 18 is a partial, exploded view of the bladed pulley shown in FIG. 12, illustrating another embodiment of a Vee-guide groove configuration.

Referring now to FIGS. 18 and 19, the second bladed pulley embodiment 210 is illustrated with another embodiment of a Vee-guide groove 269. FIG. 18 is an exploded view showing the plurality of blades 212, the outer bulkheads or support plates 217, 219, and the inner bulkheads 221, 223. In this embodiment, the bladed pulley 210 includes a single ring 288 positioned at the central region 244 of the blades 212. The ring 288 is a one-piece rolled or dished ring that defines the Vee-guide groove 269 (FIG. 19). The ring 288 is positioned about the outer circumference of the bladed pulley 210 within a corresponding cut-out or notch 290 formed in each of the outer edges 266 of the blades 212.

V. Assembly of the Second Bladed Pulley Embodiment

Similar to previous embodiment, the bladed pulley 210 is designed to: ease efforts in manufacture and assembly, maintain structural integrity and accuracy, and lessen the overall weight of a pulley. As shown in FIG. 12, the bladed pulley 210 is provided with four bulkheads 216. The two inner bulkheads 221, 223 of the four bulkheads are positioned approximately halfway between a midpoint of the pulley 210 and the ends 218, 220. The two outer bulkheads 217, 219 are positioned adjacent each of the ends 218, 220 of the pulley 210. Each of the blades 212 is positioned within the slots of the bulkheads 216.

The blades 212 are secured in a position relative to the bulkheads 216. In one method of assembly, the blades 212 and bulkheads 216 may be permanently welded together. The assembly tool 50 (FIG. 8) may be used as previously described to assemble the blades 212 to the bulkheads 216. To position the first hub 214, each of the slots 230 of the major portion 222 is aligned with the first ends 240 of the each blade 212. The blade ends 240 are slid within the slots 230 and can be secured to the hub 214 by weldments. In another method of assembly, the blades and bulkheads can be detachably, or permanently, secured together with conventional fasteners, such as bolts or rivets. It is further contemplated that a separate bracket or ring, such as retaining members 251, 252 shown in FIG. 12, may be used to couple the blades and bulkheads together in fixed relation.

Referring to FIG. 12, the retaining members 251, 252 couple to the outer diameter of the bladed pulley 210. As shown in the illustrated embodiment, the retaining members 251, 252 are configured to interconnect to notches 253 (FIGS. 13 and 15) formed in each of the blades 212. The notches 253 are formed along the outer edge 266 at each of the ends 240, 242 of the blade 212. When secured within the notches 253 of the blades 212, the first retaining member 251 deflects the first ends 240 of each of the blades 212 to retain the first hub 214, and the second retaining member 252 deflects the second ends 242 of the blades to retain the bearing 234 and second hub 215 in similar fashion.

In particular, the retaining members 251, 252 can be secured to the ends 218, 220 of the pulley 210 such that the ends 240, 242 of the blades 212 are biased radially inward to assist in maintaining the position of the first hub 214 and the bearing 234. In the illustrated embodiment, the retaining members 251, 252 include keystone rings 281, 282. The first keystone ring 281 is positioned within the notches 253 of the blades 212 between the first end 218 of the pulley and the first hub 214. The second keystone ring 282 is positioned within the notches 253 of the blades 212 between the second end 220 and the bearing 234.

Figure 17:
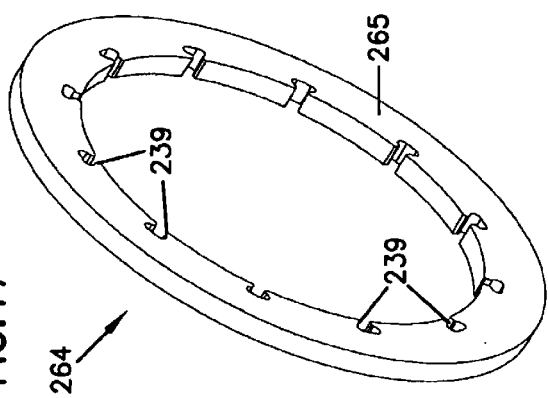
FIG. 17 is a perspective view of a Vee-ring shown in FIG. 12.

Referring now to FIGS. 12 and 17, the rings 264 positioned about the outer circumference of the bladed pulley 210 are placed within a central notch 247 (FIG. 15) formed in the outer edges 266 of the blades 212. The rings 264 include notches 239 configured to receive the outer edges 266 of each of the blades 212. Referring to FIG. 15, the central notch 247 formed in the blade 212 includes first and second locating notches 259, 261 spaced apart by a center portion 249 of the central notch 247.

In assembly, the rings 264 are positioned about the blades 212 within the first and second locating notches 259, 261. The first and second locating notches 259, 261 maintain the placement of the rings 264. In addition, when the retaining members 251, 252 are used and secured about the ends 240, 242 of the blades 212, the inward deflection of the blade ends 240, 242 causes the central region 244 of the blades to deflect or bow outward. The outward deflection of the central region 244 of the blades also assists in maintaining placement of the rings 264 about the circumference of the bladed pulley 210. The rings 264 may be seamed or secured by conventional methods. As shown in FIG. 12, inward facing surfaces 265 of the rings 264 define the Vee-guide groove 248 that receives guide structure of the conveyor belt 150, such as the guide rib 185 shown in FIG. 10. The Vee-guide groove 248 assists in maintaining proper position of the belt 150 in relation to the blade pulley 210.

VI. Structural Components of a Third Bladed Pulley Embodiment

A third bladed pulley embodiment 310 for use with a conveyor belt system is illustrated in FIGS. 20–21. The third bladed pulley embodiment 310 is similar to the second bladed pulley embodiment including orienting members or bulkheads 316 provided to orient a plurality of blades 312 about a longitudinal axis A"—A" of the pulley 310.

In particular, this embodiment also includes outer bulkheads or support plates 317, 319 and inner bulkheads 321, 323. As shown in FIG. 20, the outer bulkheads 317, 319 are located adjacent to first and second ends 318, 320 of the bladed pulley 310. The inner bulkheads 321, 323 are located between the outer bulkheads 317, 319. A first hub 314 of the bladed pulley 310 is positioned adjacent to the first outer bulkhead 317 of the bladed pulley 310. A second hub 315 and a bearing 334 are positioned adjacent to the second outer bulkhead 319 of the bladed pulley 310.

The third pulley embodiment 310 also includes retaining member 351, 352. As shown in FIG. 20, the retaining members 351, 352 couple to the outer diameter of the bladed pulley 310. In particular, the retaining members 351, 352 are configured to interconnect to notches 353 (FIG. 21) formed in each of the blades 312. The notches 353 are formed along an outer edge 366 of the blade adjacent to each of the ends 340, 342 of the blade 212. When secured within the notches 353 of the blades 312, the first retaining member 351 deflects the first ends 340 of each of the blades 312 to retain the first hub 314; and the second retaining member 352 deflects the second ends 342 of the blades to retain the bearing 334 and second hub 315 in similar fashion.

In particular, the retaining members 351, 352 can be secured to the pulley 310 such that the ends 340, 342 of the blades 312 are biased radially inward to assist in maintaining the position of the first hub 314 and the bearing 334. In the illustrated embodiment, the retaining members 351, 352 include shaft collars 381, 382. The first shaft collar 381 is positioned within the notches 353 of the blades 312 between the first outer bulkhead 317 of the pulley and the second end 320 of the pulley; more particularly between the first outer bulkhead 317 and the first inner bulkhead 321. The second shaft collar 382 is positioned within the notches 353 of the blades 312 between the second outer bulkhead 319 of the pulley and the first end 318 of the pulley; more particularly between the second outer bulkhead 319 and the second inner bulkhead 323.

As previously discussed, use of the shaft collars 381, 382 also assists in maintaining placement of rings 364 positioned about the circumference of the bladed pulley 310 by causing the blades 312 to deflect or bow outward at a central region 344 of the blades.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A pulley for use with a conveyor belt, the pulley comprising:
   (a) a first end, a second end, and a longitudinal axis extending between the first and second ends;
   (b) a plurality of blades oriented to extend radially outward from the longitudinal axis of the pulley, each of the blades including:
      (i) a first blade end;
      (ii) a second blade end; and
      (iii) an inner edge that extends between the first and second blade ends, the inner edges of the plurality of blades defining a bore at each of the first and second ends of the pulley;
   (c) orienting members positioned between the first and second ends of the pulley, each of the orienting members including a plurality of slots extending radially outward, wherein each blade of the plurality of blades is positioned within one of the plurality of slots; and
   (d) a bearing positioned within one of the bores at the first and second ends of the pulley.

2. The pulley of claim 1, further including at least one retaining member positioned adjacent the bearing, wherein the retaining member is configured to bias the blades inward toward the longitudinal axis to assist in maintaining the position of the bearing within the bore defined by the inner edges of the blades.

3. The pulley of claim 2, wherein the bearing is positioned within a first bore located at the first end of the pulley, and wherein the retaining member is positioned between the bearing and the first end of the pulley.

4. The pulley of claim 2, wherein the bearing is positioned within a first bore located at the first end of the pulley, and wherein the retaining member is positioned between bearing and the second end of the pulley.

5. A pulley for use with a conveyor belt, the pulley comprising:
   (a) a first end, a second end, and a longitudinal axis extending between the first and second ends;
   (c) a plurality of blades oriented to extend radially outward from the longitudinal axis of the pulley, each of the blades including:
      (i) a first blade end;
      (ii) a second blade end; and
      (iii) an inner edge that extends between the first and second blade ends, the inner edges of the plurality of blades defining a central pulley volume,
   (b) first and second support plates positioned adjacent the first and second ends of the pulley, each of the first and second support plates including:
      (i) a central portion; and
      (ii) a plurality of slots extending radially outward from the central portion, wherein each one of the plurality of blades is positioned within one of the plurality of slots; and
   (c) a bearing positioned adjacent to the central portion of one of the first and second support plates, wherein the inner edges of the plurality of blades contact an outer diameter of the bearing to assist in maintaining the position of the bearing adjacent to the support plate.

6. The pulley of claim 5, wherein the bearing is positioned adjacent to the central portion of the first support plate, the pulley further including a first retaining member positioned adjacent the first end of the pulley, wherein the first retaining member is configured to bias the first ends of the blades inward toward the longitudinal axis to contact the outer diameter of the bearing to assist in maintaining the position of the bearing adjacent to the first support plate.

7. The pulley of claim 6, further including a second retaining member positioned at the second end of the pulley, wherein the second retaining member is configured to bias the second ends of the blades inward toward the longitudinal axis to contact a hub positioned at the second end of the pulley.

8. The pulley of claim 7, wherein the hub includes slots that extend radially outward from a central hub portion, each of the slots being configured for receipt of one of plurality of blades.

9. The pulley of claim 6, wherein the first retaining member is positioned between the bearing and the first end of the pulley.

10. The pulley of claim 9, wherein the first retaining member is a keystone ring positioned about a circumference of the first end of the pulley.

11. The pulley of claim 9, wherein the each of the blades includes a notch formed in an outer edge of the blade, the notch being configured for receipt of the first retaining member.

12. The pulley of claim 6, wherein the first retaining member is positioned between the first support plate and the second end of the pulley.

13. The pulley of claim 12, wherein the first retaining member is a collar positioned about a circumference of the pulley.

14. The pulley of claim 12, wherein the each of the blades includes a notch formed in an outer edge of the blade, the notch being configured for receipt of the collar.

15. The pulley of claim 5, further including a guide positioned at a central region of the pulley to maintain proper position of the conveyor belt relative to the pulley, the guide including slots that extend radially inward toward the central volume of the pulley, each of the slots being configured to receive one of the plurality of blades.

16. The pulley of claim 15, further including first and second retaining members located adjacent to the first and second ends of the pulley, the first and second retaining members being configured to bias the blades outwardly at the central region to seat the blades within the slots of a v-ring.

17. The pulley of claim 5, further including inner orienting members located between the first and second support plates, each of the inner orienting members including slots that extend radially outward, each of the slots being configured to receive one of the plurality of blades.

18. The pulley of claim 5, wherein each of the blades has a non-segmented length defined between the first blade end and the second blade end.

19. The pulley of claim 5, wherein the central pulley volume is free of obstructions between the first and second support plates.

20. A pulley for use with a conveyor belt, the pulley comprising:
   (a) a first end, a second end, and a longitudinal axis extending between the first and second ends;
   (b) a plurality of blades oriented to extend radially outward from the longitudinal axis of the pulley, each of the blades including:
      (i) an outer edge, the outer edges of the plurality of blades defining an outer diameter of the pulley; and
      (ii) an inner edge opposite the outer edge, the inner edges of the plurality of blades defining:
         (A) a central open volume region; and
         (B) a bore configured to receive a bearing at one of the first and second ends of the pulley; and (c) orienting members positioned between the first and second ends of the pulley, each of the orienting members including a plurality of slots extending radially outward, wherein each blade of the plurality of blades is positioned within one of the plurality of slots; and (d) open regions located between the blades, the open regions extending into the central open volume region of the pulley.

* * * * *